Dec. 21, 1943.   G. H. SWART   2,337,169
CORK-RUBBER SHEET AND METHOD OF MAKING SAME

Filed July 27, 1940

INVENTOR
Gilbert H. Swart
BY
Evans & McCoy
ATTORNEYS

Patented Dec. 21, 1943

2,337,169

UNITED STATES PATENT OFFICE 2,337,169

CORK-RUBBER SHEET AND METHOD OF MAKING SAME

Gilbert Holm Swart, Wabash, Ind., assignor to The General Tire & Rubber Company, Akron, Ohio, a corporation of Ohio Application July 27, 1940, Serial No. 347,923

2 Claims. (Cl. 260—750)

This invention relates to a cork-rubber composition having relatively high resiliency and to a method of preparing the same. It particularly relates to a calendered sheet of such material having a backing of treated fabric, and which is suitable for use in the preparation of shoes, insoles and the like.

It has heretofore been proposed to prepare cork-rubber compositions by masticating cork into curable rubber compounds and curing the mix. Although such compositions can be prepared when the amount of cork is relatively low in relation to the rubber, extreme difficulty is experienced when an attempt is made to prepare compositions having relatively large amounts of cork masticated into solid rubber. This is probably because the rubber in masticated compositions having a large amount of cork is cured only with extreme difficulty, even when the desirable organic accelerators are present.

Cork-rubber compositions with high percentages of cork have therefore been heretofore prepared by mixing relatively costly rubber cements or rubber latices with granulated cork, spreading the material in sheet form and drying. Because of the evaporation of solvents and shrinkage of the rubber, cork-rubber sheets prepared in this manner are relatively porous and of a relatively open texture.

It is an object of this invention to provide a method for preparing calendered sheets of rubber-cork compositions, which have a relatively large amount of cork united by a relatively small quantity of rubber, and which have a smooth, non-porous structure.

Another object of this invention is to provide strong cork-rubber sheets having a relatively high percentage of cork and having a smooth, non-porous structure.

A further object of this invention is to provide calendered sheet material having a base of relatively resilient, non-porous, masticated cork-rubber composition with a backing of suitably prepared fabric, such as artificial leather.

Other objects will be apparent from the following detailed description of the invention, as illustrated by the drawing, in which.

Figure 1:
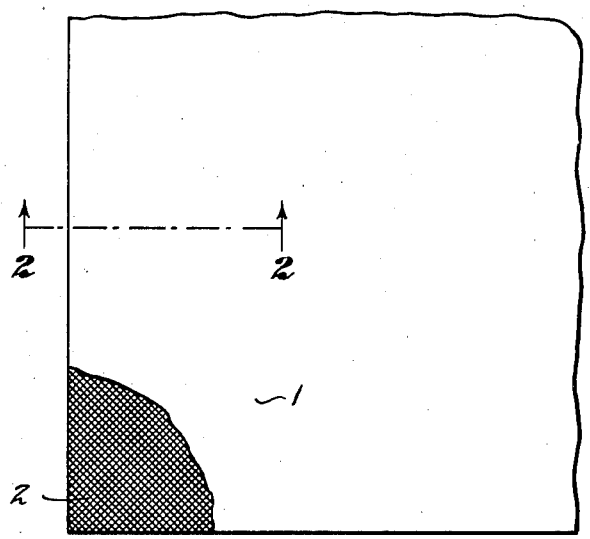
Figure 1 is a plan view, with parts broken away, of a calendered sheet material embodying the present invention.
Figure 2:
Figure 2 is a sectional view on the line 2—2 of Fig. 1.

Referring particularly to the drawing, rubber-cork sheet material is produced in accordance with this invention by masticating a large volume of cork into a suitable solid, curable rubber compound, which preferably has a Shore-type A durometer hardness of about 50 or less, and which contains a substantial amount of litharge. The mix is then calendered in thin sheet form, preferably as a cork-rubber layer 1 on a suitable backing member 2, which may be an artificial leather or fabric coated with a resin, such as a vinyl resin, a cellulose derivative, etc. If a backing member is desired, it is preferably first frictioned with a suitable rubber compound to improve the adhesion between the cork-rubber sheet and the fabric backing. The calendered cork-rubber sheet 1 with or without the backing 2 is then cured at a suitable temperature, readily apparent to those skilled in the art, whereby the elasticity and strength of the binding material is increased.

The rubber compound in the sheet material of the present invention contains a vulcanizing agent (sulphur), an accelerator, litharge, preferably a substantial proportion of reclaim rubber, and sufficient rubber softener to reduce the hardness of the mix below about 50 on the durometer type A scale. It may be prepared in a conventional manner with a suitable mixer, such as a rubber mill, and the granulated cork, preferably with a particle size of $\frac{1}{16}$ inch or less, may be incorporated by mastication into the warm mix while it is still on the rubber mill. The cork may be more than 40% and is preferably 50% to 70% of the mixture.

I have found that the rubber in cork-rubber mixes which have had a high percentage of cork masticated therein may be readily cured by incorporating litharge in the rubber compound. The litharge may be present alone, but is preferably used in combination with organic accelerators. Although litharge had wide use in rubber mixes prior to the discovery of organic accelerators, it has now been substantially entirely superseded by these compounds, but litharge is sometimes used as an agent for delaying the action of accelerators in the preparation of blown sponge rubber articles.

Litharge has an entirely different action in cork-rubber mixes than have other metal oxides, such as zinc oxide, etc., and may enter into combination with ingredients which are squeezed from the cork during mastication of the mix. It thus appears to render these undesirable ingredients ineffective in preventing the curing of the rubber with the desirable non-scorching types of organic accelerators, such for examples as captax (mercaptobenzothiazole), etc. The litharge should be present in amounts greater than .5%, based on the rubber, and preferably amounts of .5% to 5% of the mix.

I have also found that the resiliency of the cork is not lost to a deleterious degree when the cork is masticated into the compound if the rubber compound is softer than about 50 durometer hardness when the cork is added. This is particularly true when the particle size of the cork is less than 1/16 inch or so. If undesirable effects of the softener are to be avoided, the hardness of the mix should not preferably be much less than about 35 durometer.

The following example, in which the parts are by weight, illustrates the invention:

|  | Parts |
|---|---|
| Rubber | 3 to 5 |
| Reclaim | 35 to 50 |
| Accelerator (mercaptobenzothiazole) | 1 |
| Litharge | 2 to 5 |
| Softener (pine tar) | 6 to 10 |
| Zinc oxide | 3 |
| Sulphur | 1 |
| Cork | 45 to 55 |

The rubber, reclaim, litharge, softener, accelerator, zinc oxide and sulphur were first mixed in the usual manner and the cork was added to the mix on a rubber mill. Care was taken to keep the mastication of the cork to the minimum commensurate with thorough distribution through the rubber. The mix was then calendered on an unfrictioned artificial leather-like backing member, which was then heated in open air for about sixteen hours at about 175° F. to cure the rubber of the compound. The reclaim rubber is particularly desirable when an unfrictioned backing is used as it increases the tackiness of the cork-rubber composition so that it will bond firmly to the resin-coated fabric backing.

Although the sheet materials of the present invention contain a relatively high percentage of cork which was masticated into the rubber composition, they are substantially as resilient as cork-rubber compositions having the cork particles united by a binder applied in liquid form as in the form of latex or a rubber cement. The compositions of the present invention, however, have a much smoother surface structure and are more waterproof and less porous than such compositions heretofore prepared due to the presence of a substantially continuous surface film of cured, masticated, non-spongy rubber, produced on the material by the calendering and mixing operations.

The material having a base member of masticated cork-rubber composition and a backing member of fabric, which may be suitably coated with resin, is particularly desirable for the preparation of inner soles which serve as a substitute for both the bottom filler and the inner sole of shoes.

Furthermore, it is to be understood that modifications of said product and procedure can be made without departing from my invention as defined in the appended claims.

I claim:

1. A relatively strong, highly resilient, cured, calendered sheet of a masticated mixture consisting of granulated cork and a solid rubber compound, said rubber compound comprising 3 to 5 parts of rubber, 35 to 50 parts of reclaimed rubber, 6 to 10 parts of softener, 2 to 5 parts of litharge, and a relatively small amount of organic accelerator, zinc oxide and sulphur, said cork being about 40% to 55% by weight of said mixture and having substantially the resilience of unmasticated cork, said sheet being further characterized by having a relatively smooth surface film of non-spongy calendered rubber.

2. A shoe insole material consisting of a coated fabric backing and a surface layer of a vulcanized, highly resilient mixture comprising granulated cork and a non-spongy rubber compound containing 35 to 50 parts of reclaim, about 3 to 5 parts of rubber, about 6 to 10 parts of softener about 2 to 5 parts of litharge, about 45 to 55 parts of granulated cork, and sufficient organic accelerator, activator and sulphur to effect cure of the reclaim and rubber of the mixture.

GILBERT HOLM SWART.